No. 838,951. PATENTED DEC. 18, 1906.
F. B. COMINS.
HUMIDIFIER.
APPLICATION FILED NOV. 24, 1905.
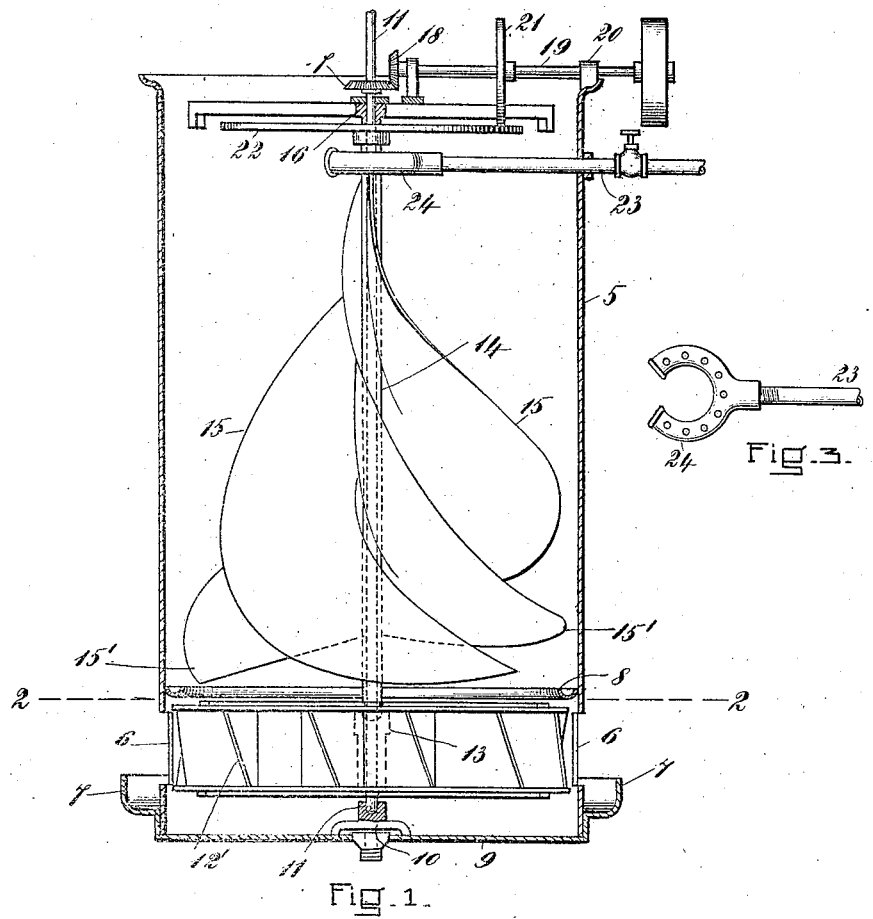
Fig. 1.
Fig. 3.
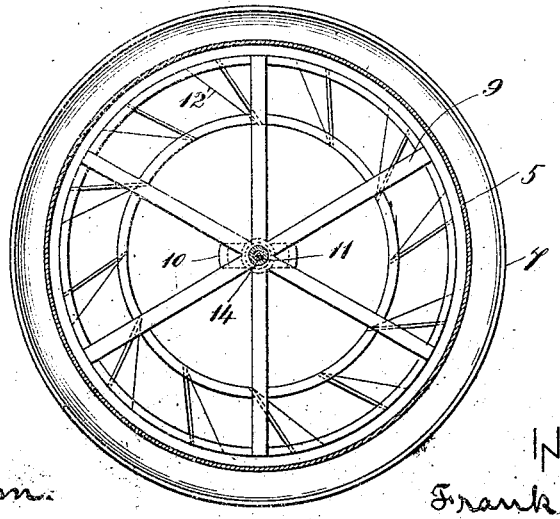
Fig. 2.
WITNESSES
Wm H. Varnum
P. C. Toner
INVENTOR
Frank B. Comins
By Henry J. Miller
atty.

UNITED STATES PATENT OFFICE.

FRANK B. COMINS, OF SHARON, MASSACHUSETTS.

HUMIDIFIER.

No. 838,951.      Specification of Letters Patent.      Patented Dec. 18, 1906.

Application filed November 24, 1905. Serial No. 288,873.

*To all whom it may concern:*

Be it known that I, FRANK B. COMINS, of Sharon, in the county of Norfolk and State of Massachusetts, have invented certain new and useful Improvements in Humidifiers; and I hereby declare that the following is a full, clear, and exact description of the same, reference being had to the accompanying drawings, forming part of this specification.

This invention has reference to improvements in machines for rendering air humid by supplying air drawn through the machine with water.

The object of the invention is to so sustain and move a thin film of water in a body of moving air that a large amount of the water is absorbed by the air.

Another object of the invention is to more completely control the distribution of the moisture.

Another object of the invention is to generally improve humidifiers or air-moistening machines.

The invention consists in the means for sustaining and moving the thin film of water, combined with mechanism whereby air is drawn over said water to absorb the same.

The invention also consists in such other novel features of construction and combination of parts as shall hereinafter be more fully described, and pointed out in the claims.

Figure 1 represents a vertical sectional view of the improved humidifier. Fig. 2 represents a cross-section view of the same, taken on line 2 2, Fig. 1, looking down on the fan. Fig. 3 represents a bottom plan view of the end portion of the water-supply pipe.

Similar numbers of reference designate corresponding parts throughout.

As shown in the drawings, in its preferred form this machine comprises a casing 5, generally cylindrical in shape, but it is evident that this shape may be considerably modified in design from that shown. The upper end of this casing is preferably open to admit of the inrush of air while the lower closed end is furnished with a series of outlets 6 6, of any desired shape and size, below which is the annular trough 7 or base-pan intended to receive any excessive moisture issuing with the air from said outlets or which is condensed on the exterior of the casing. On the inner surface of the casing above the outlets 6 6 is the trough 8, adapted to receive any moisture collecting on said inner surface and running downward.

Secured to the casing 5 is the spider 9, having at its center the bearing 10, and in this bearing is rotatably mounted the fan-shaft 11, supported at its lower end in a step-bearing mounted on the bottom of the casing, having the circular fan 12 secured thereto, the blades 12' 12' of the fan being so shaped as to draw down the air when the fan is rotated in the right direction. The central portion of the fan has the step-bearing 13, in which is rotatably supported the tubular shaft 14, independently rotatable on the shaft 11 and having the series of water-receiving blades 15 15, which are narrow at their upper ends and gradually widen out toward their lower ends until their lower ends are near to the inner surface of the casing 5. In their downward extension these blades 15 15 are curved spirally around the tubular shaft 14 and their cross-sectional shape is slightly concavo-convex. This shape may, however, be modified, as the main object of their use is to so sustain and spread the water over their upper surfaces that an extremely thin film of water is supported by practically the entire surfaces of the blades without running therefrom, whereby practically all the water supplied to the upper ends of these blades may be absorbed by the air passing thereover before the water passes off the lower ends 15' 15' of the blades, which may in a sense be considered waterways.

On the upper end the shaft 11 is furnished with the bevel-gear 17, which is preferably driven by the bevel-gear 18 on the shaft 19, journaled in the bearing 20 and driven in any ordinary manner. On the shaft 19 is the friction-disk 21, the edge of which bears against the surface of the friction-disk 22 on the tubular shaft 14. Below the disk 22 is the water-supply pipe 23, connected with any source of water-supply and having the U-shaped end 24 perforated at its under surface to supply water in comparatively small quantities to the upper ends of the blades 15 15.

The rotation of the shaft 19 effects the rotation of the shafts 11 and 14 through the medium, respectively, of the gears 17 and 18 and the disks 21 and 22, the shaft 11 being preferably driven considerably faster than the shaft 14, so that while the blades 15 15 are slowly rotated currents of air are rapidly drawn over the moistened surfaces thereof and, following the curves of said surface, a vortex is created, and the air is guided in spiral directions toward the lower part of the casing 5, where it issues, in a humid condition, from the outlets 6 6. It is obvious that the speed at which the shafts 11 and 14, or the relative speed of said shafts, may be varied at will, and in some cases the shaft 14 and its blades 15 may be prevented from rotating by removing one of the disks 21 or 22. Therefore I do not wish to limit myself necessarily to any specific degree of rotation of these parts or to the relative direction of rotation thereof.

Having thus described my invention, I claim as new and desire to secure by Letters Patent—

1. A humidifier comprising a casing, a series of spiral waterways mounted centrally of said casing and enlarging toward their lower ends, and means for drawing currents of air downward through said casing.

2. A humidifier comprising a casing, a shaft centrally disposed in said casing, a series of spiral blades mounted on said shaft, said blades being narrow at their upper ends and gradually increasing in width toward their lower ends, means for delivering water to the surfaces of said blades, and means for drawing currents of air downward through said casing.

3. A humidifier comprising a cylindrical casing having an inner annular trough near its lower end and outlets, a series of spiral blades centrally disposed in said casing and gradually increasing in width toward their lower ends until said lower ends approximately overhang the edge of said trough, means for supplying moisture to the upper portion of said casing, and means for drawing currents of air downward through said casing.

4. A humidifier comprising a casing, a shaft rotatably mounted in said casing and having a series of spiral blades which gradually increase in width toward their lower ends, means for rotating said shaft, means for supplying moisture to the upper portion of said blades, and means for drawing currents of air downward through said casing.

5. A humidifier comprising a casing a shaft rotatably mounted in said casing and having a drawing-fan, a tubular shaft rotatably mounted on said fan-shaft and having a series of spiral blades which gradually increase in width toward their lower ends, means for driving said shafts independently, and means for delivering water to the upper ends of the spiral blades as and for the purpose described.

In testimony whereof I affix my signature in presence of two witnesses.

FRANK B. COMINS.

Witnesses:
HENRY J. MILLER,
PHYLLIS TONER.